United States Patent [19]

Mullin

[11] Patent Number: 5,787,028

[45] Date of Patent: Jul. 28, 1998

[54] MULTIPLE BIT MULTIPLIER

[75] Inventor: Ronald C. Mullin, Waterloo, Canada

[73] Assignee: Certicom, Corp., Mississauga, Canada

[21] Appl. No.: 626,237

[22] Filed: Mar. 29, 1996

[30] Foreign Application Priority Data

Mar. 30, 1995 [GB] United Kingdom ............... 9506574

[51] Int. Cl.[6] ............................... G06F 7/00; G06F 15/00
[52] U.S. Cl. ............................................... 364/746.1
[58] Field of Search ..................... 364/746.1, 715.011, 364/736.03, 754.02, 757

[56] References Cited

U.S. PATENT DOCUMENTS

| 4,251,875 | 2/1981 | Marver et al. ............... 364/746.1 |
| 4,587,627 | 5/1986 | Omura et al. ............... 364/746.1 |
| 4,745,568 | 5/1988 | Onyszchuk ................... 364/746.1 |
| 4,797,848 | 1/1989 | Walby ............................ 364/746.1 |

FOREIGN PATENT DOCUMENTS 0080528  6/1983  European Pat. Off.

OTHER PUBLICATIONS

Pincin, A New Algorithm for Multiplication in Finite Fields, IEEE Transactions on Computers, vol. 38, No. 7, pp. 1045–1049 (1989).

*Primary Examiner*—Reba I. Elmore
*Assistant Examiner*—Robert J. Dolan
*Attorney, Agent, or Firm*—Baker, Maxham, Jester & Meador

[57] ABSTRACT

A finite field multiplier in $GF2^{mn}$ is formed from a pair of m celled shift registers and an m celled accumulating cell. Logical connections are established to generate grouped terms in respective cells of the accumulating cell upon retention of the vector of the subfield elements in each shift register. Each cell contains a subfield element in the form of an n-tuple and the logical connections perform arithmetic operations in accordance with the inherent subfield arithmetic to provide an n-tuple in each cell of the accumulating register. A product of two vectors can be obtained in m clock cycles. By mapping between registers, squaring of a vector can be obtained in one clock cycle.

9 Claims, 5 Drawing Sheets

| CELL | 0 | 1 | 2 | 3 | 4 | 5 | 6 | 7 | 8 | 9 |
|---|---|---|---|---|---|---|---|---|---|---|
| $X$ | $b_{00}$ | $b_{01}$ | $b_{10}$ | $b_{11}$ | $b_{20}$ | $b_{21}$ | $b_{30}$ | $b_{31}$ | $b_{40}$ | $b_{41}$ |
| $X^2$ | $b_{41}$ | $b_{40}$ | $b_{01}$ | $b_{00}$ | $b_{11}$ | $b_{10}$ | $b_{21}$ | $b_{20}$ | $b_{31}$ | $b_{30}$ |

5,787,028

MULTIPLE BIT MULTIPLIER

BACKGROUND OF THE INVENTION

The present invention relates to a finite field multiplier and a method of performing such a multiplication.

In U.S. Pat. No. 4,745,568, there is disclosed a finite field multiplier that determines the product of two elements in a chosen finite field. The elements are represented as a vector of m subfield elements and the product is also represented as a vector of m subfield elements. The subfield elements are the coefficients of the components that constitute a normal basis of the chosen finite field. Each subfield element of the vector representing the product may be expressed as a logical combination of the subfield elements representing the elements and may be arranged as m grouped terms, each comprising the sum of certain subfield elements of one of the elements multiplied by a subfield element of the other of the elements. By arranging each of the subfield elements of the product in this way, a symmetrical offset between the grouped terms may be exploited permitting the product to be computed in an efficient manner.

In the above arrangement, the subfield elements of the elements B and C are stored in respective m cell cyclic shift registers and the logical combinations of the subfield elements representing the grouped terms of the product D accumulated in an m celled accumulating register. Logical connections are established between the cells of the shift registers and the cells of the accumulating register so that a different grouped term is generated in each of the accumulating cells. The logical connections are also arranged so that each of the accumulating cells generates a grouped term from a different subfield element of the product. By circulating the contents of each register, a successive grouped term of each subfield element of the product is generated in respective ones of the accumulating cells.

In this way the logical connections are uniformly distributed among the cells to facilitate the implementation of the multiplier in an integrated circuit. Moreover, even for large values of m, the maximum number of product terms may be maintained at 2m−1 by adoption of an optimal normal basis representation and so minimize the connections.

The multiplier described in the above patent has been implemented for relatively large values of m, up to 593, and has proven efficient where large numbers of multiplications are required, for example in exponentiation as used in encryption processes.

The minimum number of clock cycles required to circulate the subfield elements through the registers is m but for some implementations the number of clock cycles may be enlarged to simplify the logical connections required. As data rates increase and as the fields used for encryption are increased to enhance security, the throughput of the multiplier becomes a limiting factor.

There is therefore a need to reduce the time taken to compute a product below the m clock cycles required in the embodiments shown in the above patent whilst retaining the benefits of finite field multiplication.

SUMMARY OF THE INVENTION

In general terms, the present invention is based on the recognition that the relationships defining the grouped terms of a product in terms of the subfield elements of two elements will apply even where the subfield elements are n-tuples as opposed to single bits provided the subfield arithmetic is implemented to perform an n-tuple computation. Thus, a multiplication of, for example, a pair of elements represented by nm binary digits may be performed with an m bit multiplier operating on n-tuples rather than singles.

The resultant vector representing the product has m subfield elements each arranged as an n-tuple that may be expanded to a vector having n.m binary digits.

By reducing the number of cells in each of the registers, the number of clock cycles required to shift cyclically the registers and perform the multiplication is correspondingly reduced and so the throughput is increased.

The logical operations required in the subfield arithmetic to implement the computation of the grouped term may be defined as computations on single bits, rather than n-tuples to facilitate processing.

Conveniently, the computation is performed in the field $GF(2^m)$ so that addition of n-tuple subfield elements may be performed as a bit wise XOR function and multiplication may be performed by an AND function. Thus, the logical connections between the cells of the registers may incorporate the logic functions necessary for n-tuple computation in a simple yet effective manner.

BRIEF DESCRIPTION OF THE DRAWINGS

An embodiment of the invention will now be described by way of example only with reference to the accompanying drawings, in which.

DESCRIPTION OF THE PREFERRED EMBODIMENT

Figure 1:
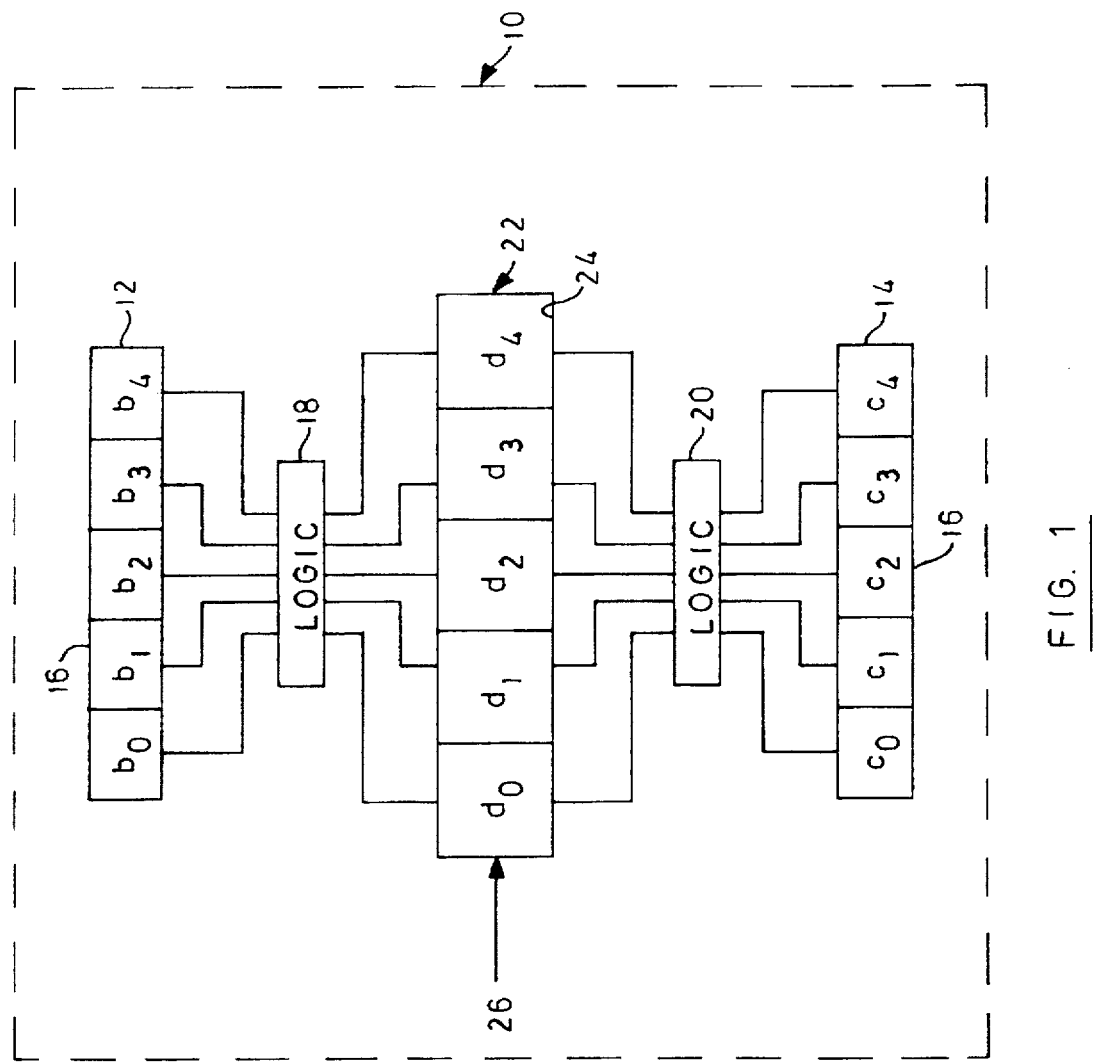
FIG. 1 is a representation of a multiplier to compute the product of two 10 bit elements.

Referring therefore to FIG. 1, a multiplier 10 includes a pair of shift registers 12,14 each of which has m cells 16. In the embodiment shown, each of the registers 12,14 has 5 cells to perform a multiplication in $GF(2^5)$ but it will be understood that the number of cells will depend upon the field in which the computation is to be performed.

The registers 12,14 are connected by logic arrays 18,20 to an accumulating register 22 which has 5 accumulating cells 24. A clock input 26 is provided to each of the registers 12,14,22 to generate a cyclic shift of the contents of the cells in respective ones of the registers 12,14,22.

The contents of the shift registers 12,14 represent the subfield elements of an element B,C respectively in $GF(2^5)$ and have the general form $(b_0, b_1, b_2, b_3, b_4)$ and $(c_0, c_1, c_2, c_3, c_4)$. The product D will also be represented as 5 subfield elements $(d_0, d_1, d_2, d_3, d_4)$. Each subfield element $d_i$ of the product D may be represented as the logical combination of subfield elements $b_i$, $c_i$ of the elements B,C and generally the subfield element $d_i$ will be of the form $$d_i = b_{i+4}(c_{i+4} + c_{i+3} + c_{i+1} + c_i) +$$
$$b_{i+3}(c_{i+4} + c_{i+2} + c_{i+1} + c_i) +$$
$$b_{i+2}(c_{i+3} + c_i) +$$
$$b_{i+1}(c_{i+4} + c_{i+3}) +$$
$$b_i(c_{i+4} + c_{i+3} + c_{i+2})$$

All subscripts are added mod 5 so that the respective subfield elements $d_0 \ldots d_4$ of D expressed as logical combinations of the subfield elements $b_i$, $c_i$ of elements B and C are $d_0 = b_4(c_4+c_3+c_1+c_0)+b_3(c_4+c_2+c_1+c_0)+b_2(c_3+c_0)+b_1(c_4+c_3)+b_0(c_4+c_3+c_2)$ $d_1 = b_0(c_0+c_4+c_2+c_1)+b_4(c_0+c_3+c_2+c_1)+b_3(c_4+c_1)+b_2(c_0+c_4)+b_1(c_0+c_4+c_3)$ $d_2 = b_1(c_1+c_0+c_3+c_2)+b_0(c_1+c_4+c_3+c_2)+b_4(c_0+c_2)+b_3(c_1+c_0)+b_2(c_1+c_0+c_4)$ $d_3 = b_2(c_2+c_1+c_4+c_3)+b_1(c_2+c_0+c_4+c_3)+b_0(c_1+c_3)+b_4(c_2+c_1)+b_3(c_2+c_1+c_0)$ $d_4 = b_3(c_3+c_2+c_0\ c_4)+b_2(c_3+c_1+c_0+c_4)+b_1(c_2+c_4)+b_0(c_3+c_2)+b_4(c_3+c_2+c_1)$ It will be appreciated from the above that by establishing logic connections to generate the first grouped term $b_4(c_4+c_3+c_1+c_0)$ of subfield element $d_0$ in the first cell of accumulating register, the first grouped term of the binary digits $d_4$, $d_3$, $d_2$, and $d_1$ will also be generated in that cell by these same connections if the subfield elements of B and C are successively rotated one place to the right.

If connections are also established to the next cell of accumulating register to generate the second grouped term of $d_0$ after the generation of the first grouped term and the rotation of the subfield elements, the same connections will in fact generate the second grouped term of $d_1$ in the second cell whilst the first grouped term of $d_0$ is generated in the first cell. Thus by establishing connections to generate successive group terms of the subfield elements $d_0$ in successive clock cycles, it is possible to accumulate in parallel each of the subfield elements of the vector representing the product D. This simplifies implementation of the logic arrays 18,20.

Figure 2:
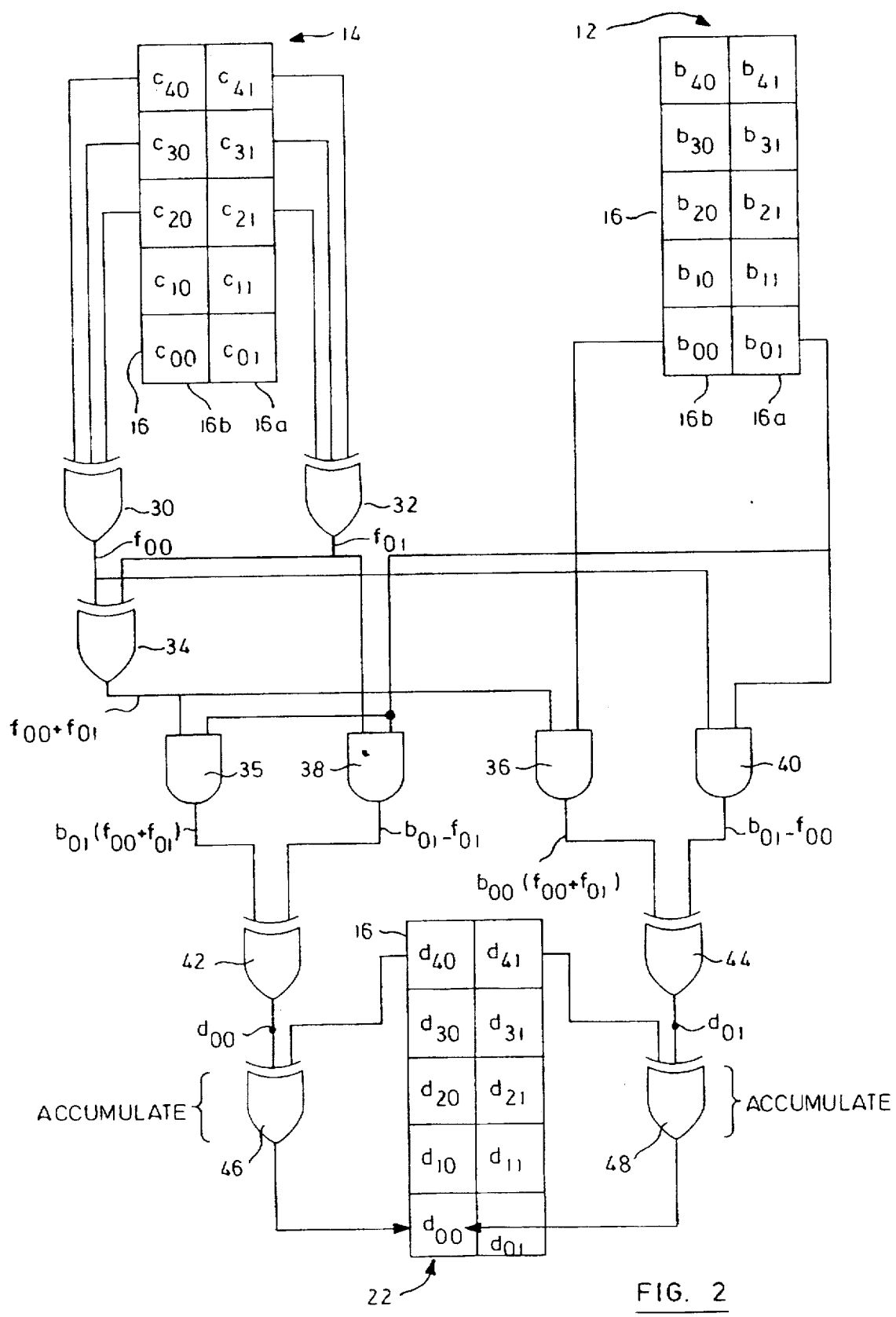
FIG. 2 is an expanded representation of one part of the logic array shown in FIG. 1.

Each cell 16 of the registers 12, 14, 22 is subdivided into a pair of subcells 16a, 16b as shown in FIG. 2. Each cell 16 can thus contain a subfield element in the form of a "double" comprising a pair of binary digits. In general, the cells 16 may be subdivided into n subcells to contain subfield elements of n binary digits, generically referred to as an n-tuple. In the example of FIG. 2, each pair of binary digits are adjacent subfield elements in a 10 bit representation of elements B and C in the field $GF(2^{10})$. The use of doubles as subfield elements permits an element in the field $GF(2^{10})$ to be represented as an element in GF25. Each of the five cell shift registers 12,14 may contain an element B,C and multiplication can then be performed in $GF(2^5)$ and completed in five clock cycles. The resultant product will also be represented as doubles in the cells 16 of the register 22.

The multiplication of GF25 may be completed using the logic arrays 18,20 to establish the appropriate connections to generate grouped terms in $GF2^{(5)}$ and to take into account the n-tuple configuration of the subfield elements. Each of the relationships established above will govern the accumulation of terms in respective ones of the accumulating cells provided that the arithmetic operations of addition and multiplication performed on the subfield elements is performed with regard to the n-tuples.

Where the logic uses a normal basis subfield arithmetic, the addition of two doubles is performed by a bit wise XOR function. Thus, for example, the addition $c_0$ with $c_1$, involves the addition of double $(c_{00}c_{01})$ with $(c_{10}c_{11})$ and is completed by XORing $c_{00}$ and $c_{10}$ and XORing $c_{01}$ and $c_{11}$. The result is a new double $f_0$ represented by bits $f_{00}$, $f_{01}$.

Similarly, for a normal basis arithmetic the multiplication of two digits e.g. $b_0$ and $c_0$ involves the multiplication of two doubles $(b_{00}, b_{01})$ and $(c_{00}, c_{01})$. The result is a double $d_0$ having bits $(d_{00}, d_{01})$ where $d_{01} = \{b_{01}(c_{00}+c_{01})+b_{01}c_{00}\}$ and $d_{00} = \{b_{01}(c_{00}+c_{01})+b_{00}c_{01}\}$ This computation requires operations on single bits only with addition performed by an XOR function as described above and the product terms computed with an AND function.

Given the grouped term to be generated in the accumulating cells 24 of register 26 and the subfield arithmetic, the logical connections in logic 18,20 may be established. In FIG. 2, the portion of the logic array 18,20 to product the term to be accumulated in accumulating register $d_0$ is exemplified and has the logical connections that implement the term $b_0(c_2+c_3+c_4)$.

The first stage implements the addition $(c_2+c_3+c_4)$ by bit wise XORing of $c_{20}; c_{30}; c_{40}$ and $(c_{21}; c_{31}; c_{41})$ at XOR gates 30,32. The output of the gates 30,32 represent components $(f_{00}, f_{01})$ of a double $f_0$.

The next stage is to compute the product $d_0$ of $b_0.f_0$ which when expanded has the components $d_{00}$ $d_{01}$ of the form $d_{00} = b_{01}(f_{00}+f_{01})+b_{00}f_{01}$; and $d_{01} = b_{00}(f_{00}+f_{01})+b_{01}f_{00}$ The term $(f_{00}+f_{01})$ can be computed by XOR gate 34 and its output multiplied with $b_{01}$ and $b_{00}$ at AND gates 35,36 respectively.

The product terms $b_{00}f_{01}$ and $b_{01}f_{00}$ are computed by AND gates 38,40 respectively and added to respective ones of the outputs of the AND gates 35,36 at XOR functions 42,44.

The outputs of XOR gates 42,44 represent the components $d_{00}$ $d_{01}$ of subfield elements $d_0$. These are added to the contents shifted from cell $d_4$ which itself is a couple $d_{40}d_{41}$. The accumulation in $d_0$ can therefore be obtained from an XOR function 46,48.

Thus for each cyclic shift, a grouped term is generated in each of the cells 16 and accumulated with the subfield elements previously generated.

Accordingly, after five clock cycles, the subfield elements representing the product D are contained in the cells 16 of the register 22 with each represented as a couple.

A product of two 10 bit elements may be produced in 5 clock cycles with the logic connections only required to compute single bit XOR or AND functions.

It will of course be appreciated that the logic connections will vary for each of the cells 16 but that once established they will compute the appropriate grouped terms as the subfield elements are circulated as more fully set out in the U.S. Pat. No. 4,745,568.

By way of further example, consider the element B to be a vector of the form 1111111111 and the element C to be of the form 0101010101.

The element B will be represented in the register 12 by doubles 11 so that it will have the form:

| $b_0$ | $b_1$ | $b_2$ | $b_3$ | $b_4$ |
|---|---|---|---|---|
| 1 | 1 | 1 | 1 | 1 |
| 1 | 1 | 1 | 1 | 1 |

The element C will similarly be represented in the register 14 as doubles 01 so that it will have the form:

| $c_0$ | $c_1$ | $c_2$ | $c_3$ | $c_4$ |
|---|---|---|---|---|
| 0 | 0 | 0 | 0 | 1 |
| 1 | 1 | 1 | 1 | 1 |

The grouped term associated with the 1st cell of the accumulating register 22 is computed as indicated above so that $f_0$ will be the double (0.0) and the components $d_{00}$, $d_{01}$, will be (0.0).

After five clock cycles, the contents of the accumulating cell 22 will be of the form:

| 0 | 0 | 0 | 0 | 0 |
|---|---|---|---|---|
| 1 | 1 | 1 | 1 | 1 | which can be expanded to form a 10 bit vector 0101010101 representing the product of B and C. This has been completed in five clock cycles rather than the 10 required if the a $GF2^{10}$ finite field multiplier is used.

The logic may be implemented for triples, quadruples or any n-tuples with addition and multiplication being performed with single bit AND and XOR functions. For example, a product X of two triples $b_0$ and $c_0$ having components $b_{00}$ $b_{01}$ $b_{02}$ and $c_{00}$ $c_{01}$ $c_{02}$ will be of the form $d_{00}$ $d_{01}$ $d_{02}$ where $$d_{00} = b_{02} \cdot c_{02} + b_{00} \cdot c_{01} + b_{01} \cdot c_{00} + b_{01} \cdot c_{02} + b_{02} \cdot c_{01}$$

$$d_{01} = b_{00} \cdot c_{00} + b_{01} \cdot c_{02} + b_{02} \cdot c_{01} + b_{02} \cdot c_{00} + b_{00} \cdot c_{02}$$

$$d_{02} = b_{01} \cdot c_{01} + b_{02} \cdot c_{00} + b_{00} \cdot c_{02} + b_{00} \cdot c_{01} + b_{01} \cdot c_{00}$$

Once again, each tuple of the subfield element may be generated with a simple logic of 5 AND gates to perform a bit wise multiplication and an XOR function to perform the bit wise addition, permitting an 3-fold reduction in clock cycles.

Alternative implementations of the logic may be used to derive each n-tuple. For example the term $d_{00}$ would be expressed as $$d_{00} = b_{02}(c_{01}+c_{02}) + b_0 c_1 + b_{01}(b_{00}+c_{02})$$

so that the logic would first bit wise XOR the additive terms, then AND the product terms and finally bit wise XOR the resultant additive terms. In this case 6 logic gates would also be required but the n-tuple would be generated in 3 stages rather than two.

The above examples have utilised a normal basis subfield arithmetic to establish the logical connections necessary to produce the group term. Thus the logic arrays 18,20 implement the subfield arithmetic inherent in a normal basis to compute the sums and products of the n-tuples. It is also possible to compute the n-tuples of the product term using any convenient subfield arithmetic provided it is applies in a consistent manner with a consistent set of rules and the logic implements those rules.

For example, the subfield arithmetic may be performed in a polynomial basis rather than normal basis to compute the grouped terms which when accumulated will produce the product term in optimal normal basis representation.

In each of the above examples, the logical connections have been exemplified as hard logic elements to perform the subfield arithmetic in real time. As an alternative approach, the logical connections may be established by use of a look up table. A table may be utilised that provides for each cell of the accumulating register the representation of the n-tuple of the grouped term resulting from the n-tuples in the registers 12,14. The look up table contains the logic array whose output corresponds to the component of the grouped term resulting from the application of the inherent subfield arithmetic. Thus, where for example a grouped term is generated from a pair of n-tuples, the look up table may simply provide the resultant n-tuple for each possible combination of inputs rather than implement the full logic array.

In the above examples, it has been assumed that the order of the n-tuple will be fixed, i.e. a double, triple or the like. However, in certain applications it is advantageous to be able to use the same multiplier with vectors from different fields, e.g. $GF2^{10}$ or $GF2^{25}$. Because the relationship for the underlying field $GF2^m$ holds regardless of the value of n, the finite field multiplier 10 is able to accommodate different values of n provided logic is provided to implement the appropriate subfield arithmetic. Thus, for example, provided a logic array 18 is available for the subfield arithmetic inherent in the subfield where n=2 and an additional logic array is available to implement the arithmetic for the case where n=3, then the multiplier 10 may handle computations in $GF2^{10}$ or $2^{15}$ in five clock cycles by selection of the appropriate logic.

Figure 3:
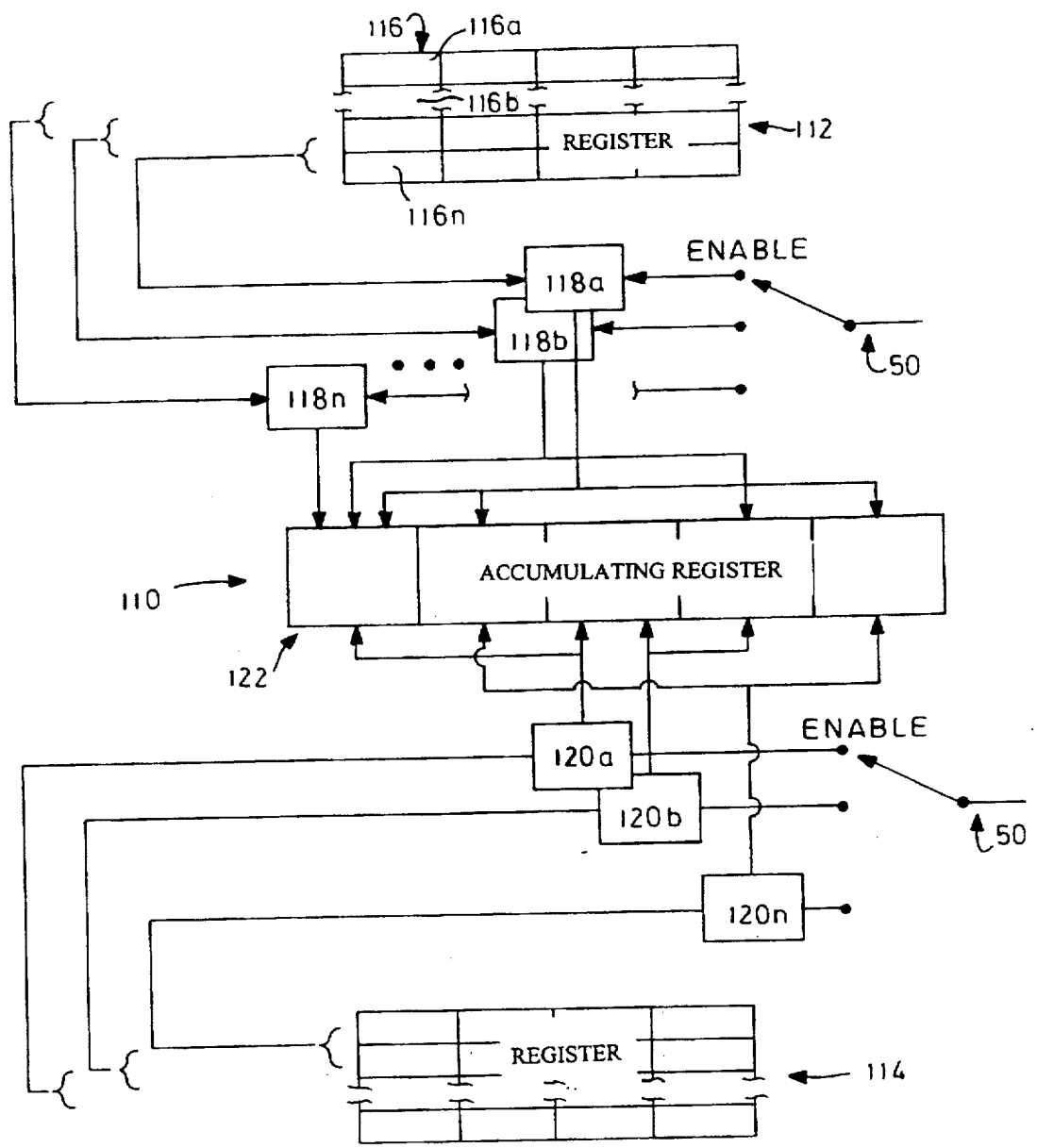
FIG. 3 is a schematic representation of an alternative embodiment of multiplier.

A schematic example is shown in FIG. 3 where like reference numerals will denote like components with a prefix 1 added for clarity.

Referring therefore to FIG. 3, the multiplier 110 includes the shift registers 112,114. Each of the registers 112,114 includes m cells 116 and each cell is an array of n subcells 116a, 116b . . . 116n. A plurality of logic arrays 118a, 118b . . . 118n and 120a, 120b . . . 120n are connected between the registers 112,114 and accumulating register 122 to generate the respective grouped terms in the cells of the accumulating register 122.

Each pair of logic arrays, e.g. 118a,120a; is associated with a particular value of n so as to generate the grouped term by implementing the subfield arithmetic inherent in that value of n. Thus, for example, the logic arrays 118b, 120b may implement the subfield arithmetic for the value n=2 to perform computations for elements of $GF2^{10}$ and logic arrays 118e, 120e may implement the subfield arithmetic for n=5 to perform computations for $GF2^{25}$. The appropriate logic array may be selected by a switch 50 from the configuration of elements B and C. In this manner the same multiplier 110 may handle elements from different fields.

For the arrangement shown in FIG. 3, it is particularly useful for the logic arrays 118,120 to be in the form of look up tables described above and implemented "on chip" with the multiplier 110 to avoid multiple layers of logic elements.

One of the attributes of working in a normal basis representation in $GF2^m$ is that squaring of an element may be achieved in a single clock cycle with a single cycle shift of the subfield elements. As squaring is utilized in a number of operations in $GF2^m$, for example to perform an inversion or exponentiation, there is a significant benefit from the speed associated with this operation.

A similar attribute may be obtained with the multiplier shown in FIGS. 1–3 by arranging each n-tuple as a normal basis representation in $GF2^n$.

In the example of $GF2^5$, the element is represented by a normal basis ($\beta$, $\beta^2$, $\beta^{2^2}$, $\beta^{2^3}$, $\beta^{2^4}$) which for convenience may be written as $(\beta_0, \beta_1, \beta_2, \beta_3, \beta_4)$. Each of the subfield elements 16a has a pair of binary digits, each of which is a member of $GF2^2$. If the subfield is presented in a normal basis $(\gamma,\gamma^2)$ written as $\gamma_0, \gamma_1$, for convenience, then each subcell 16a can be considered to be identified or labelled by a pair $\beta_i, \gamma_j$.

Operations represented in the array correspond to calculations performed in terms of the basis of $GF2^{10}$, consisting of 10 pairs $\beta_i, \gamma_j$ and commonly referred to as the product basis. It is well known to those skilled in the art that if one takes the product of normal bases $\{\beta_0 \ldots \beta_{m-1}\}$ for $GF2^m$ and $\{\gamma_0 \ldots \gamma_{n-1}\}$ for $GF2^n$, where m and n are relatively prime, then a normal basis for $GF2^{mn}$ is obtained generated by $\beta_0, \gamma_0$.

In the example with m=5 and n=2, the normal basis is $$\beta_0\gamma_0; (\beta_0\gamma_0)^2; (\beta_0\gamma_0)^{2^2}; \ldots (\beta_0\gamma_0)^{2^9}\}$$

which can be reduced and rewritten as $$\{\beta_0\gamma_0; \beta_1\gamma_1; \beta_2\gamma_0; \beta_3\gamma_1; \beta_4\gamma_0; \gamma_0\gamma_1; \beta_1\gamma_0; \beta_2\gamma_1; \beta_3\gamma_0; \beta_4\gamma_1\}$$

as $\beta^{2^5} \equiv \beta_0$ and $\gamma_0^{2^2} \equiv \gamma_0$.

For convenience, this may be written as $\{\delta_0, \delta_1, \delta_2, \ldots \delta_9\}$.

As noted above, a typical element x is represented in this basis in the form:

$$x = b_0\beta_0\gamma_0 + b_1(\beta_0\gamma_0)^2 + \ldots + b_9(\beta_0\delta_0)^{2^9}$$

where $b_i$ is in GF(2); i.e. 0 or 1.

$x^2$ is then of the form:

$$b_9(\beta_0\gamma_0) + b_0(\beta_0\gamma_0)^2 + \ldots b_8(\beta_0\gamma_0)^{2^9}$$

which is a cyclic shift of the subfield elements of x.

It has now been recognized that a squaring may be achieved with the n.m array of registers by performing a simple permutation of the co-ordinates which can be accomplished in a single clock cycle.

Figures 4, 5:
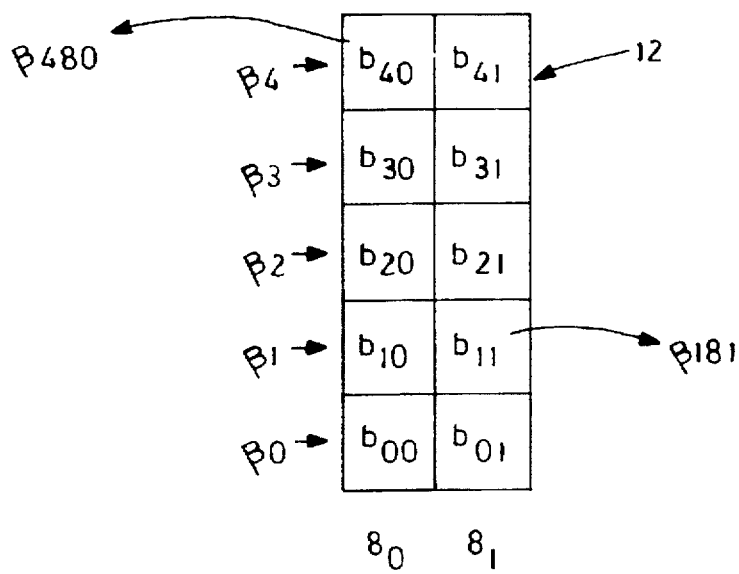
FIG. 4 is an enlarged view of one of the registers shown in FIG. 2 with appropriate nomenclature indicated.
FIG. 5 is a table showing the mapping between a normal representation of an element and its square.

By way of example, FIG. 4 shows the register 12, as shown in FIG. 2, with identifications of $\beta$ and $\gamma$ accorded. The nomal basis representation is shown above for $GF2^{10}$ and therefore the element in the register 12 shown in FIG. 4, expressed in a nomal basis, has the form:

$$b_{00}\delta_0 + b_{11}\delta_1 + b_{20}\delta_2 + b_{31}\delta_3 + b_{40}\delta_4 + b_{01}\delta_5 + b_{10}\delta_6 + b_{21}\delta_7 + b_{30}\delta_8 + b_{41}\delta_9$$

Squaring this element requires a cyclic shift in the nomal basis representation and so has the form:

$$b_{41}\delta_0 + b_{00}\delta_1 + b_{11}\delta_2 \ldots b_{30}\delta_9.$$

Redistributing this to the register 12 using the identification of FIG. 4 provides a mapping of the subfield elements involved in the squaring operation as set out in FIG. 5.

This mapping will of course be consistent in $GF2^{10}$ and for other fields a similar mapping can be derived.

Figure 6:
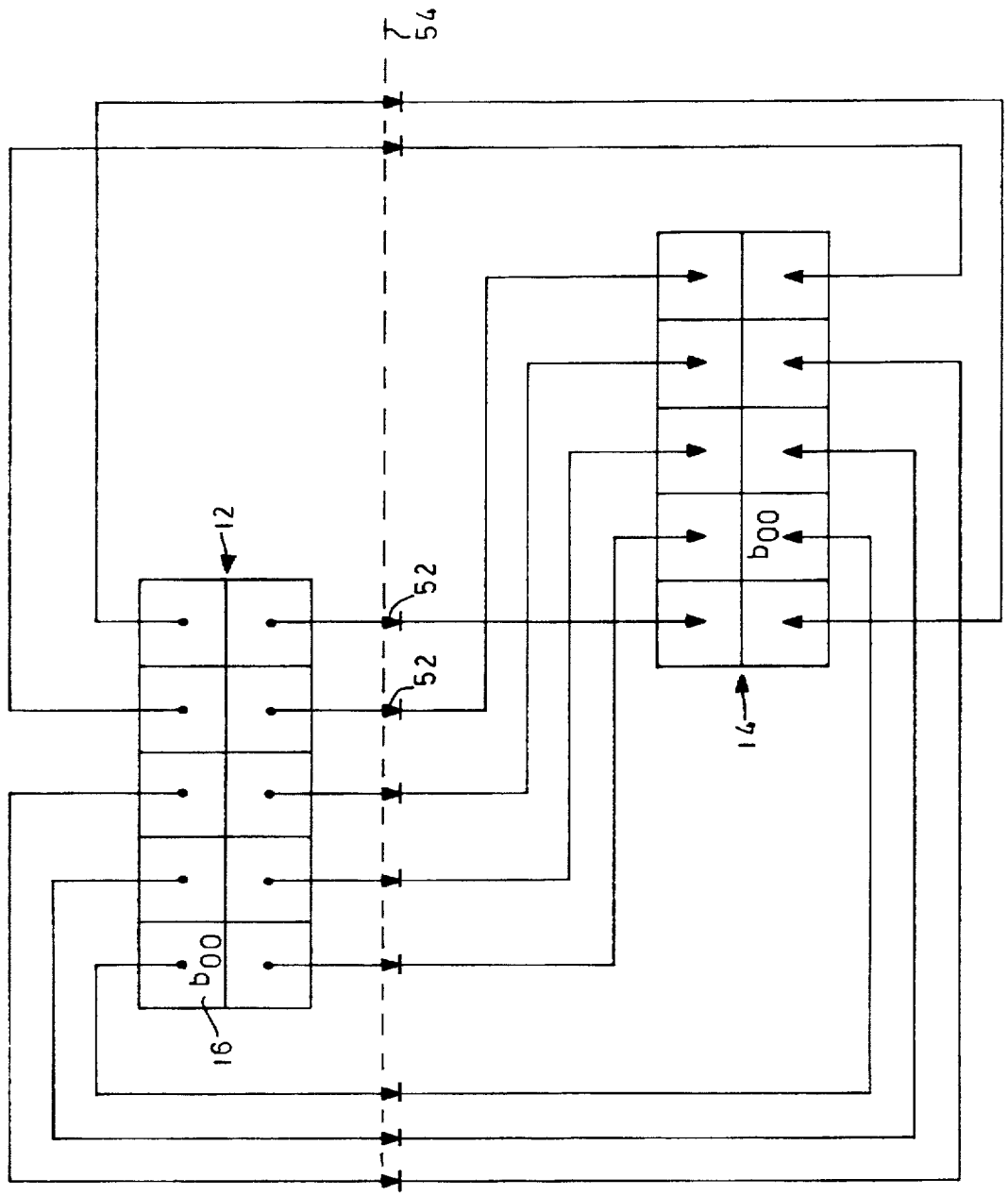
FIG. 6 is a simplified view of the registers showing the connections established for a squaring operation.

Accordingly, as shown in FIG. 6, connections can be established between the subcells 16a in register 12 and the subcells 16a in register 14 that effect the requisite mapping to produce the nomal basis representation of the square of the element in that register 14. The shift can be achieved in one clock cycle as with a cyclic shift and of course the selection of the squaring operation is controlled through appropriate switching controls indicated as diodes 52 and signal line 54.

Accordingly, the multiplier may perform finite field multiplication in the field $GF2^{nm}$ in m clock cycles and also perform a squaring operation in a single clock cycle.

In each of the above embodiments, it has been assumed that the registers exist as hardware components that may be implemented as a VLSI circuit. It will be appreciated that the multiplier may be implemented in software to perform the logical operations and mapping as exemplified above.

I claim:

1. A method of computing the product D of two elements B,C of the finite field $GF(2^{nm})$ where n and m are integers greater than 1, the field having components $A^{2^i}$ $o \leq i < nm$ that constitute a normal basis for $GF2^{nm}$ as an extension of $GF2^n$, comprising the steps a) representing the element B as a vector of subfield elements $b_i$, where $b_i$ is the coefficient of in said normal basis representation of B, b) representing the element C as a vector of subfield elements $c_i$, where $c_i$ is the coefficient of in said normal basis representation of C, c) converting the representation of elements B and C to vectors of m subfield elements with each subfield element represented as a n-tuple, d) storing in successive cells of a first m cell recirculating shift register the n-tuples representing the element B, e) storing in successive cells of a second m cell recirculating shift register the n-tuples representing the element C, f) establishing logical connections between the m cells of the first and second shift registers and a m cells product register to provide a m subfield element finite field multiplier in which grouped terms representing the subfield elements of the product D are generated in the respective ones of the m cells of the product register as the contents of said shift registers and product registers are cyclically shifted, said logical connections performing arithmetic operations bit wise on the n-tuples as determined by a grouped term and subfield arithmetic inherent in the subfield elements to provide an n-tuple subfield element in each of the m cells of the product register, and g) continuing cyclic shifting of said registers until all grouped terms are generated.

2. A method according to claim 1 wherein the logical connections generate a different grouped term in each of the cells of the product register at each cyclic shift of the registers.

3. A method according to claim 1 wherein said logical connections utilize a normal basis subfield arithmetic.

4. A method according to claim 1 wherein said logical connections include look-up tables to determine from a pair of n-tuples an n-tuple resulting from the application of said inherent subfield arithmetic.

5. A finite field multiplier having first and second m celled recirculating shift registers, an m celled accumulating register, and logical connections between said cells of said accumulating register and said recirculating registers to generate in each cell of said accumulating register a grouped term representing the subfield elements of the normal basis representation of a product D of two elements B and C each of which is represented as a vector of subfield elements in respective cells of the shift registers, each of said cells having n subcells to retain an n-type representing one of said subfield elements, said logical connections providing at respective cells of said accumulating register an n-tuple field element resulting from the application of the subfield arithmetic inherent in said subfield elements, whereby cyclic shifting of said registers generates successive grouped terms of said subfield elements.

6. A finite field multiplier according to claim 5 wherein said logical connections include look-up table to provide the n-tuple resulting from a combination of a pair of n-tuples upon application of said inherent subfield arithmetic.

7. A finite field multiplier according to claim 5 wherein a plurality of logical connections are provided, each implementing a subfield arithmetic for a different order of n-tuple, and a selector is provided to select an appropriate one of said logic connections.

8. A finite field multiplier according to claim 5 wherein connections are established to map between registers the permutation of subfield elements to product in one register the normal basis representation of the square of an element in another register.

9. A method of generating the square of an element x in the finite field $GF2^{mn}$ and represented as a vector of mn subfield elements which are the coefficients of components $A^{2^i}$ of $GF2^{mn}$ that constitute a normal basis for $GF2^{mn}$ comprising the steps of arranging in a first register said vector as m subfield elements representing coefficients in the normal basis representation of $GF2^m$ with each of said m subfield elements comprising an n-tuple of n binary digits in respective subcells representing coefficients of a normal basis representation in $GF2^n$, mapping the permutation of said binary digits resulting from a cyclic shift of the vector as represented in a product normal basis that is the product of said normal bases $GF2^m$ and $GF2^n$, establishing connections between said one register and another register to replicate said mapping and shifting said binary digits from said one register to another to obtain a representation $x^2$ as coefficients of the product normal basis.

* * * * *

UNITED STATES PATENT AND TRADEMARK OFFICE
Certificate

Patent No. 5,787,028                                                                Patented: July 28, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Ronald C. Mullin, Mississauga, Canada; Scott. A. Vanstone, Campbellville, Ontario, Canada; and Gordon B. Agnew, Campbellville, Ontario, Canada.

Signed and Sealed this First Day of March 2005.

THOMAS G. BLACK
*Supervisory Patent Examiner*
Art Unit 3661